United States Patent
Hatle

(10) Patent No.: US 10,030,310 B1
(45) Date of Patent: Jul. 24, 2018

(54) METHODS FOR REMOVAL OF REACTION SITES ON METAL SURFACES AND APPLICATION OF A NANOTUBE CONTAINING PROTECTING COATING

(71) Applicant: Clean Metal Technologies, L.L.C., Houma, LA (US)

(72) Inventor: Loren L. Hatle, Humble, TX (US)

(73) Assignee: Clean Metal Technologies, LLC, Houma, LA (US)

(*) Notice: Subject to any disclaimer, the term of this patent is extended or adjusted under 35 U.S.C. 154(b) by 59 days.

(21) Appl. No.: 15/012,618

(22) Filed: Feb. 1, 2016

Related U.S. Application Data

(60) Provisional application No. 62/112,530, filed on Feb. 5, 2015, provisional application No. 62/179,665, filed on May 15, 2015.

(51) Int. Cl.
*B08B 3/08* (2006.01)
*C23G 1/08* (2006.01)

(52) U.S. Cl.
CPC .................................. *C23G 1/088* (2013.01)

(58) Field of Classification Search
None
See application file for complete search history.

(56) References Cited

U.S. PATENT DOCUMENTS

| | | |
|---|---|---|
| 2,463,837 A * | 3/1949 | Weinrich ............... C23C 14/10 427/162 |
| 2,538,702 A | 1/1951 | Noble et al. |
| 3,368,913 A | 2/1968 | Ziehr et al. |
| 3,529,999 A | 9/1970 | Boeniger |
| 3,684,720 A | 8/1972 | Richardson |
| 4,234,442 A | 11/1980 | Cornelissens |
| 4,622,161 A | 11/1986 | Cornelissens et al. |
| 5,160,654 A | 11/1992 | Falon et al. |
| 5,259,984 A | 11/1993 | Hull |
| 5,317,841 A | 6/1994 | Cook et al. |
| 5,441,441 A | 8/1995 | Cook et al. |
| 5,462,697 A | 10/1995 | Yianakopoulos |
| 5,527,203 A | 6/1996 | Cook et al. |
| 6,190,738 B1 | 2/2001 | Beck |
| 9,193,943 B1 | 11/2015 | Hatle et al. |
| 2003/0162685 A1 * | 8/2003 | Man ..................... C11D 3/046 510/445 |
| 2004/0002433 A1 | 1/2004 | Buckland et al. |
| 2005/0245412 A1 | 11/2005 | Shah et al. |
| 2007/0065587 A1 * | 3/2007 | Hatle ..................... B08B 3/08 427/299 |
| 2009/0048141 A1 | 2/2009 | Spandoni et al. |
| 2010/0170534 A1 | 7/2010 | Hatle et al. |
| 2011/0210049 A1 * | 9/2011 | O'regan, Jr. ....... G05B 19/4185 210/85 |
| 2012/0291815 A1 * | 11/2012 | Monsrud ............... C11D 3/042 134/25.2 |

* cited by examiner

*Primary Examiner* — Nathan T Leong
(74) *Attorney, Agent, or Firm* — Roy Kiesel Ford Doody & Thurmon, APLC

(57) ABSTRACT

A method of preparing and decontaminating a substrate surface to remove contaminants including the steps of applying a first dry or fluid composition having a pH of 4 or less comprising an acidifier and an oxidizer, allowing the first composition to remain on the substrate surface for a predetermined period of time, and rinsing the first composition from the substrate surface with a second composition having a pH of 8 or more comprising an alkaline material liquid mixture formed utilizing activated carbon filtered potable water to achieve a neutral pH condition on the surface, and then applying a nanotubes coating on the surface.

12 Claims, No Drawings

METHODS FOR REMOVAL OF REACTION SITES ON METAL SURFACES AND APPLICATION OF A NANOTUBE CONTAINING PROTECTING COATING

CROSS-REFERENCE TO RELATED APPLICATIONS

The present patent application claims priority to the provisional patent application identified by U.S. Ser. No. 62/112,530 filed on Feb. 5, 2015, as well as the provisional patent application identified by U.S. Ser. No. 62/179,665 filed on May 15, 2015, the entire content of both applications are hereby incorporated into this disclosure by reference.

BACKGROUND OF THE INVENTION

Field of the Invention

This invention relates in general to decontamination of concrete, metal and other surfaces, and more particular to compositions and methods for preparing and decontaminating the surfaces and application of coatings for prevention of degradation of the surfaces or other coatings applied to the surfaces.

Prior Art

Maintaining the surface conditions of concrete, metal and similar structures and equipment has been and remains a major problem for the petrochemical and oil industry, as well as other industries having plants operating in harsh environmental conditions.

It is common in several industries to apply coatings to substrates for a variety of purposes. For example, metallic and other substrates can be contacted with a protective layer that reduces wear on the use of the substrates. However, there remains a need for coatings that better prevent and combat corrosion degradation of the substrate surfaces.

No matter the form or makeup of the substrate, it is highly desirable that the substrate be effectively cleaned prior to application of the coating. If the substrate is not prepared properly prior to application of the coating; the effective life of the coating can be adversely affected. Ultimately, the substrate may need to be re-cleaned and re-coated, which can introduce additional cost for the maintenance of the apparatus having the substrate and typically requires that the apparatus be taken offline during these processes.

Various coatings are applied to metallic and concrete substrates. It is highly desirable that the metallic substrate be effectively cleaned of ionic contaminants prior to the application of the coating so that the useful coating life may be prolonged. These contaminants can lead to aggressive corrosion of the underlying substrate.

A key accelerant of aggressive corrosion is the result of microbiological, water and non-water soluble surface ionic contaminants, either because they directly attack substrates or cause premature coating failure. Microbial Influenced Corrosion (MIC) is caused by a specific genera of bacteria, such as sulfate reducing bacteria, acid producing bacteria, and other genera, which produce metabolic byproduct contaminants (i.e., that greatly increase osmotic blistering) which is a principal cause of substrate corrosion that leads to deterioration of the bond between the substrate surface and the coating. Bacteria settle next to the substrate and produce acids and other ionic compounds that corrode the steel and cannot be removed using standard methods alone.

Unless these contaminants are effectively removed, surface coatings trap these contaminants between the coating and substrate. As moisture and other compounds begin to permeate the coating film, these particles stimulate the formation of corrosion cells caused by these microbial byproduct contaminants, water soluble and non-water soluble ionic contaminants and start the corrosion process. As the surface of the substrate corrodes, moisture vapor begins to build pressure between the coating and the substrate. Ultimately, this can result in premature failure of the coating.

As an example, media blasted steel substrates are susceptible to corrosion and coating failure due to moisture-based chloride. Ferrous chloride is formed whenever steel or iron and soluble chloride in moisture are in contact. This reaction, in itself, is a strong corrosive of steel surfaces. Upon exposure to air, ferrous chloride oxidizes to ferric chloride, a hygroscopic salt with a natural affinity for moisture in the air. Trace amounts of either ferric or ferrous chloride remaining on the substrate accumulate moisture from the air resulting in the formation of a concentrated iron chloride solution on the surface of the steel substrate. Iron ions, chloride ions and water comprise an electrolytic solution that drives an electrochemical corrosion reaction. Coatings applied over such a substrate fail in a short period of time due to the concentrated iron chloride solution on the substrate drawing water through the coating by osmosis and creating a blistering or disbandment of the coating. Rates of coating failure due to osmotic blistering are dependent on the thickness and porosity of the coating.

Contamination of substrates from soluble salts has been identified as a source of coating failure and has been thoroughly documented. Practical, cost effective solutions to the problem have eluded engineers in the coating science field. Complicating the search for cost-effective solutions is the lack of standards defining acceptable levels of soluble salt contaminations or concentrations on substrates. The level of cleanliness required varies significantly with the service environment and the characteristics of the coating selected. However, independent of these variables, it has been proven that the cleaner the substrate, the greater the resistance to coating disbandment.

Various coatings are also applied to concrete substrates. Concrete is of course different from metallic such as steel in that it is not chemically reactive with water soluble salts such as sodium chloride.

Concrete is a cast material that is porous by nature. The porosity of concrete may provide water and air pockets extending from the surface into the material to a depth of one inch or more. The amount of porosity varies with the method of casting of the cement and the type of finish applied. Hard troweling of the surface minimizes porosity.

The coating performance of concrete substrates is affected primarily by two problems. One problem involves the formation of a thin layer of non-reaction materials on the surface of cured new concrete as a residue. The residue forms a weak powdery material with little adhesive strength and therefore is not acceptable for the subsequent application of a coating material over the surface of the concrete. The other problem is that concrete of any age which has not been cleaned contains water-soluble salts in the voids. These salts create the same hygroscopic condition created by salt contaminants in steel because a microscopic layer of water is always present on the substrate regardless of temperature and humidity conditions, due to the hygroscopic nature of the salt contaminants. Coatings applied over salt contaminated surfaces fail in a short period of time due to poor adhesion caused by osmotic blistering.

Also, particularly when horizontal concrete surfaces are etched with acid, such as hydrochloric or muriatic acid, the reaction of the acid with the cement creates soluble salts, which are present in the pores of the concrete. The removal of such soluble salts heretofore has been attempted by the use of a still bristle broom and copious amounts of rinse water, which in many instances have been ineffective.

Standard responses to corrosion and the costs associated with corrosion are pervasive and highly standardized. Typical corrosion prevention measures include the use of various surface blasting processes and anti-corrosion materials. However, these measures fail to address molecular causes of corrosion. The approaches only delay the inevitable damage to serviceability or destruction of assets. For example, under normal circumstances metallic material in contact with corrosive materials must be remediated and recoated with a protective coating on average every five years. This represents a significant ongoing cost that only slows the negative impacts of corrosion.

The standard anti-corrosion process follows a series of industry-defined stages. The process typically begins with careful cleaning of surfaces to a visual standard, such as those specified by the National Association of Corrosion Engineers (NACE) or The Society for Protective Coatings (SSPC). These standards of cleanliness, referred to as blasts, result in a surface that when viewed without magnification appears to be free of all visible oil, grease, dust, dirt, mill scale, rust, coating, oxides, corrosion products and other foreign matter.

The process consists of blasting an abrasive to achieve a specified standard of visual cleanliness (i.e., NACE 1, NACE 2, etc.) according to the requirements of the project and the specifications of the coating to be applied. Typically the blasting abrasive will consist of silica sand or equivalent material that is dry, neutral pH, and free of dust, clay or other foreign materials.

After the blasting stage, it is usually necessary to control the environment of the surface to allow for application of the coating. This can become a cost intensive process requiring industrial desiccant dryers and additional days of downtime. Alternatively, the environment may need to be cooled, which reduces humidity. Dehumidification (DH) is costly and time consuming.

Once the surfaces are visually clean, and existing environmental factors meet the specifications provided by the coatings manufacturer, an anti-corrosion coating may be applied.

Another method for the removal of surface contaminants from metallic and concrete substrates comprises the use of blasting an abrasive material in a pressurized water stream against the metallic and concrete surfaces for cleaning the surface. Rinsing the surface would then follow up this blasting. A problem with this method is that the equipment used to provide the pressurized water stream is very specialized, expensive to purchase, and expensive to transport and store. Another problem is that using the abrasive material in the pressurized water stream can leave areas that were not directly contacted with the pressurized stream uncleansed. Having to directly cover the entire surface with the pressurized stream would be very time consuming and inefficient.

To overcome the problems associated with the various abrasive blasting procedures, various formulations have been developed to clean the surfaces of metal and concrete substrates. In these prior art methods a pre-rinse step is often employed to provide removal of visible contaminants from the surface of the substrate. This pre-rinse is accomplished using de-ionized water to minimize chemical reaction with the metal surface. Unfortunately, the use of de-ionized water is both expensive and in many cases not readily available at the treatment site. After the pre-rinse step, the methods first employ an acidic composition that can be in a powder form, a gel form or a liquid form that is placed over the surface of the substrate to break down visible and non-visible layers of surface material. Following this acidic solution treatment, an alkaline composition is applied to the surface of the substrate to neutralize the pH of the substrate surface. Finally, a second de-ionized water rinse is applied to remove any substances that may have formed on the substrate surface and to further neutralize the pH to 7.

Although these compositions combinations have proven to be effective in preparing a substrate surface to be covered with an anti-corrosive coating, they are still expensive, time consuming and not as effective as may be desired.

One such solution has been applying various coating on the surface of the substrate to be protected. Before applying such coatings it is highly desirable that the substrate be effectively cleaned of any contaminants to prolong the useful life of the coatings. Failure to properly remove such contaminants can over time lead to rusting and other degradations of the surface. Such contaminants include liquid halogens, sulfur compounds, and occasionally nitrogen compounds. Such contaminants also include water-soluble salts, such as chlorides, sulfates and nitrates. For steel substrates common salt contaminants are iron salts (ferrous and ferric salts) which have been identified as a major contributor to contamination and source for coating failures resulting from the blistering or destruction of the bond between the coating and the substrate. Proper surface preparation must address complete removal of both water-soluble and non-water soluble contaminants to achieve a surface molecular oxidation state of zero for any metal components of the surface. Proper surface preparation would prevent contaminants being trapped underneath a coating, thereby allowing the substrate to be damaged even after a protective coating is applied. There remains in the industry a need for more effective and more economical compositions and methods for preparing the surface of a substrate for receiving a coating.

Another solution has been the use of an abrasive to blast the surface to remove the contamination. Conventional grit blasting techniques were not designed to remove ionic contamination. Dry abrasive blasting cannot efficiently remove localized sources of corrosion initiation sites (commonly referred to as corrosion cells) because an operator may not be able to see such contaminants and direct a dry grit blast against such corrosion initiation sites. Efforts to develop methods for removal of these non-visible contaminants from substrates have been generally unsuccessful although several techniques have been tried with partial success, such as, for example, (1) dry blasting followed by water rinsing (several cycles), (2) hard grit wet abrasive blasting, (3) high pressure washing, and (4) acid washing followed by water rinsing. Further improvements in these methods include the selection of the abrasive, including sodium bicarbonate, and the use of a high purity water to remove the neutralized soluble salts, other surface contaminants, and any residual abrasive material.

Unfortunately, the cost and time utilizing these methods are not satisfactory.

A composition and cost effective method that could achieve the desired removal of a wide range of surface contaminants and prepare a neutral pH surface for receiving one or more protective coatings in a reasonable time would be of particular use to the petrochemical and oil industry and other industries operating in a harsh environment.

OBJECTS AND SUMMARY OF THE INVENTION

Therefore, one object of this invention is to provide a method to prepare surfaces of materials such as concrete and metals to remove contaminants and prevent degradation of both coatings and the underlying material through oxidation or other chemical processes.

Another object of this invention is to provide a method to prepare surfaces of materials such as concrete and metals to remove contaminants and improve adhesion of barrier coatings by removing the reaction corrosion sites on the substrate.

A further object of this invention is to provide a method to prepare surfaces of materials such as concrete and metals that utilizes potable water rather than de-ionized water.

Still another object of this invention is to provide a method to prepare surfaces of material such as concrete and metals to remove contaminants using components that are safe to use and environmentally friendly.

Another object of this invention is to provide a method to prepare surfaces of material such as concrete and metals that result in increased substrate life due to decreased degradation of the substrate.

Another object of the invention is to provide a method to prepare surfaces of material such as concrete and metals that result in reduced maintenance costs by reducing the amount of time required to prepare surfaces for coatings and minimizing the wait time between the preparation and application of coatings.

A still further object of this invention is to provide a method to prepare surfaces of materials such as concrete and metals utilizing equipment and materials that are portable, easy to implement and easy to transport while still being effective to improve reliability and life of the underlying material.

Another object of this invention is to provide a method to prepare surfaces of materials such as concrete and metals that can be applied with low-pressure equipment and utilizing less water, in less time and with a lower cost that currently utilized means.

Another object of this invention is to provide a method to prepare surfaces of materials such as concrete and metals that are passive, such that the surface is less reaction to atmospheric gasses, moisture and contaminants due to the highly effective removal of contaminants and subsequent surface pH adjustment.

Another object of this invention is to apply a superior novel coating to the decontaminated and prepared surface.

A still further object of this invention is to apply a nanotube-containing coating, such as a coating comprising quartz nanotubes, to the decontaminated and prepared surface of a substrate to provide better prevention of contamination of the surface and increased live of the substrate.

These and other objects of this invention shall become apparent from the ensuing descriptions of the invention.

Accordingly, a method of preparing and decontaminating a concrete or metal surface to remove contaminants including the steps of applying a first composition in a powder, gel or liquid form having a pH of 4 or less comprising an acidifier and an oxidizer, allowing the first composition to dwell on the surface for a predetermined period of time, and rinsing the first composition from the surface with a second composition having a pH of 8 or more comprising an alkaline material to achieve a neutral pH condition on the surface. Once the surface has been decontaminated and prepared for application of a protective coating, then a nanotube-containing coating is applied to the surface by any of the known application methods.

The foregoing has outlined rather broadly the features and technical advantages of the present invention in order that the detailed description of the invention that follows may be understood. Additional features and advantages of the invention will be described hereinafter that form the subject of the claims of the invention. It should be appreciated by those skilled in the art that the conception and specific embodiments disclosed may be readily utilized as a basis for modifying or designing other formulations and methods for carrying out the same purposes of the present invention. It should also be realized by those skilled in the art that such equivalent formulations and methods do not depart from the spirit and scope of the invention as set forth in the appended claims. The novel features which are believed to be characteristic of the invention, both as to its organization and method of operation, together with further objects and advantages will be better understood from the following description.

PREFERRED EMBODIMENTS OF THE INVENTION

If the substrate surface is contaminated with organic compounds, soil or other similar type material that is adhered to the surface, it may be preferable to first rinse the substrate surface with water. In accordance with this invention it is preferred to use activated carbon filtered potable water that has been de-chlorinated to remove these materials before applying the first decontamination composition of this invention to the substrate surface. If desired, the de-chlorinated potable water can be sprayed on the substrate surface by a pressurized stream of the de-chlorinated potable water to remove any of these materials that may be adhered to the substrate surface.

If the substrate surface is significantly contaminated, particularly by scale buildup or similar compounds that cannot be readily removed by chemical treatment, it may be preferable to utilize any of the known blasting or scraping methods to remove such mill scale or other scale buildup, smooth the substrate surface, and remove contaminates. Following this optional step, the method utilizing the first decontamination composition of this invention can then be used to complete the removal of the contaminants from the substrate surface.

As indicated the first step of the method of this invention a first composition comprising an acidifier and an oxidizer having a pH of 4 or less is applied to the substrate surface. If the surface is a hard metal or comprised of an aggregate material, then it is preferred the acid and oxidizer be selected to form a solution having a pH of less than 2. The first composition can be applied in powder form, gel form, liquid form, or a powder mixed with a liquid to create a solution. Typically, for cost savings reasons the first composition will be delivered to the treatment site in a powder form. If it is desired to apply the first composition in a powder form, it can be sprayed or sprinkled on the surface. However, in many cases the powder will be mixed at the treatment site with sufficient amounts of activated carbon filtered potable water to dissolve the powder in the de-chlorinated potable water to create a treatment fluid (or can be initially supplied as a fluid) and applied by any known method of applying liquids which include, but are not limited to: electrostatic means, brush, roller, conventional pressure washer, air assisted application equipment, wet abrasive blast equipment, airless sprayer, conventional sprayer, garden sprayer, or spray bottle. Alternatively, the powder can mixed with a gel, such as xanthan gum, guar gum, smectite clay, organic polymer thickeners and silica based thickeners; and then applied to the substrate surface by any known conventional method.

In order to get more thorough coating of the first component, the surface can be vibrated using various techniques known to persons ordinarily skilled in the art. For example, pneumatic, ultrasound, or mechanical methods can be used.

The ability to utilize de-chlorinated potable water, which can be obtained from filtering onsite readily available potable water through an activated carbon filter, results in a substantial reduction in transportation costs through the elimination of transporting the large quantities of liquid necessary to provide the rinsing steps of the invention. In addition such de-chlorinated potable water is far less expensive than de-ionized water needed with current metal surface treatment methods.

When treating a steel surface the first composition preferably comprises an acidifier chosen to form a coating of an oxidized form of iron, such as iron carbonate, on the steel surface. This coating is not a residue, but a desired result to passivate the metal surface; i.e., render the metal surface less reaction to atmospheric gasses, moisture, and contaminants. The passivation is achieved through the highly effective removal of contaminants and subsequent surface pH adjustment that results in greatly reduced, or no anodic/cathodic activity, and greatly reducing or eliminating bacterial metabolic byproduct content, such as iron sulfide, typically produced by sulfur reducing bacteria.

There are numerous organic and mineral acids, as well as salts of organic and mineral acids, that serve to create a solution of low pH. However, it has been found that when using a liquid form or solution of the acid and oxidizer in powder form, the acid and oxidizer should preferably have a mesh size of at least 1180 microns to better ensure complete mixing with the de-chlorinated potable water used to form a liquid or solution of the first composition.

Suitable mineral acids include hydrochloric acid, nitric acid, phosphoric acid, sulfuric acid, boric acid, hydrofluoric acid, hydrobromic acid, and perchloric acid. Suitable organic acids are numerous and an exhaustive listing is impractical. It is only required that they can generate the desired pH values. Preferably, they will be short and medium chain organic acids and will be food grade acids due to their lower environmental impact. The most preferred acids include citric acid anhydrous and sodium bisulfate due to their low toxicity level, low cost, ease of acquisition, and favorable reactivity characteristics.

The oxidizers are selected to react with non-water-soluble sulfides attached to the substrate surface. Oxidizers that can be used include, but are not limited to organic peroxides, inorganic peroxides, peracids, peresters, and combinations thereof. Commonly used oxidizers include persulfates, perborates, percarbonates, and combinations thereof. Preferred oxidizers include hydrogen peroxide and sodium persulfate due to their stability, cost and low environmental impact. If the first composition is to be a powder composition, then sodium persulfate is preferred; and wherein the oxidizer constitutes 0.1 wt. % to 10 wt. % of the first composition, and more preferably about 3.6 wt. %. When the first composition is in liquid form, it comprises the dry powder as defined herein mixed with a sufficient quantities of the de-chlorinated potable water to dissolve the dry powder in the de-chlorinated potable water.

In another preferred embodiment the first composition can also comprise a rheology modifier to thicken the first composition to create improved adhesion of the first composition to a vertical surface ("vertical cling") to better achieve and maintain a more complete coverage of the first composition on the substrate surface. When a rheology modifier is used as an optional constituent, the first component further serves as a barrier between the substrate and the atmosphere. This prevents the exposure of the acidified substrate surface to the moisture, oxygen or other atmospheric gasses, or air contaminants, thus preventing undesired reactions such as flash rust or recontamination of the surface.

The rheology modifier can be in powder form, fluid form, or powder mixed with a liquid to create a solution. It is preferred that the rheology modifier be selected to create an oxygen barrier between the substrate surface and the atmosphere to aid in the efficacy of the method.

Rheology modifiers that can be used include, but are not limited to xanthan gum, guar gum, smectite clay, organic polymer thickeners, silica based thickeners, and combinations thereof. The preferred rheology modifier is xanthan gum, which is desirable due to its ease of solubility, biodegradability, safety, and low environmental impact.

In a preferred embodiment of the invention the first composition once applied to the substrate surface is allowed to sit on the substrate surface for a predetermined period of time ("dwell" time), to permit the first composition to react with the contaminates and facilitate their removal. This dwell time allows the elements of the first composition to react with contaminants on the surface of the substrate. In addition to the other contaminants discussed above, typical chemical contaminants on metal and concrete surfaces include, but are not limited to chlorine compounds, oxygen compounds, nitrogen compounds, and sulfur compounds.

The dwell time can be adjusted by persons ordinarily skilled in the art to account for various factors which include, but are not limited to substrate composition, contaminant level, specific constituents used in the first component, volume of the first component used, atmospheric pressure, and temperature. However, a typical dwell time for metal surfaces can range from fifteen minutes to an hour, preferably thirty minutes to an hour, at ambient temperature, but also can vary greatly depending on the situation. A typical dwell time for concrete can range from fifteen minutes to an hour, preferably thirty minutes to an hour, at ambient temperature, but also can vary greatly depending on the situation.

If the substrate surface is seriously contaminated, it is preferred that the first composition be re-applied to the substrate surface to better assure that any contamination on the substrate surface has been removed.

In one or more embodiments, mechanical action, such as scrubbing, vibration, etc., can be incorporated in the methods to reduce the time and/or chemical and/or pressure to remove surface contaminants.

Once the first composition has completed its reaction time with the substrate surface, the substrate surface is rinsed with the second composition until the substrate surface is neutralized. Selection of the rinse is dependent upon a variety of factors. The second component is desirable to create a modified surface that greatly retards flash rusting, is less subject to undesirable chemical reactions due to contaminants, and has superior acceptance for coatings. Usage of the second component creates an alkaline layer upon the substrate. During drying, the second composition evaporates and leaves the surface with a generally neutral pH. The second component comprises an alkaline material, such as, sodium carbonate, sodium bicarbonate, but preferably a fugitive alkaline material, such as dimethylethanolamine (DMEA). By utilizing a fugitive material, there is no chemical residue left upon the substrate surface upon drying. In one or more embodiments, drying of a surface can be accelerated by heating, forced air circulation, or other methods known to persons ordinarily skilled in the art.

Potable water that has been filtered through an activated carbon filter can be used to combine with either the first or second composition to create a liquid solution or to dilute the solutions to achieve the desire concentrations. It can also be used as a rinse in this method. Activated carbon filtered potable water includes any water suitable for drinking that has been filtered through an activated carbon filter to remove chlorine and other undesirable compounds that may be in the water. The use of activated carbon filtered potable water rather than a de-ionized water is significant in reducing costs and assuring availability at the treatment site.

In some cases, for example when the surface of the substrate is oddly shaped, it may be desirable to submerge the substrate in a bath as opposed to applying the components. In this embodiment, the substrate can be submerged in an ambient or heated bath of the components and allowed a soak time as an alternative to applying the components and allowing a dwell time. Soaking the substrate in a bath has the added benefits of no exposure to atmospheric components, better coverage of the substrate with components, and increased ability to control component temperatures.

In the embodiments that a bath is used, the fluid in the bath can be agitated by mechanical means, ultrasound, or vibration. The mechanical means can include a recirculation of fluid through stirring, or the use of fluid nozzles. Ultrasound can be applied to the bath, or to the object to agitate the bath. Further, vibration mechanisms can help to loosen contaminants in the bath.

In a preferred embodiment the first composition in powder form comprises:

| COMPONENT | PREFERRED RANGE | MOST PREFERRED |
| --- | --- | --- |
| sodium persulfate | 0.1 wt. %-10 wt. % | 3.6 wt. % |
| citric acid | 75 wt. %-85 wt. % | 82.2 wt. % |
| sodium bisulfate | 1.0 wt. %-5 wt. % | 2.3 wt. % |
| xanthan gum | 10.0 wt. %-15 wt. % | 11.9 wt. %. |

Once the substrate surface has been decontaminated and prepared for acceptance of a protective coating, a coating comprising nanotube material will be applied to the substrate surface by any of the many known application methods, including, but not limited to, dipping, spraying, rolling, or brushing the coating on the substrate surface.

The proposed nanotechnology-enhanced corrosion control coating will prevent and combat corrosion degradation by directly targeting the thermodynamic enablers to corrosion, namely the galvanic cell formed between the anode, cathode and electrolyte. The nanotechnology-enhanced coatings not only use covalent and ionic molecular bonds to link together the nano particles used in the surface coatings themselves, but also to link the coatings to the substrate. When the coating and substrate surface are bonded together the coatings form very hard structures; and the bonding between the coating and the substrate "welds" the substrate and the coating together as a single structure providing unsurpassed adhesion, such that the coating and the substrate form a "union". The result means that the surface is more completely covered and protected. A preferred form of the nanotube is a nano-sized quartz particle.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What I claim is:

1. A method of decontaminating a substrate surface to remove contaminants and preparing the decontaminated substrate surface for applying a protective coating on the substrate surface comprising the steps of:
   a. applying to the substrate surface a first composition having a pH of 4 or less comprising citric acid anhydrous having an average mesh size of at least 1180 microns and sodium persulfate having an average mesh size of at least 1180 microns;
   b. allowing the first composition to remain on the substrate surface for a predetermined period of time; and
   c. rinsing the first composition from the substrate surface with a second composition having a pH of 8 or more comprising an alkaline material liquid mixture formed utilizing activated carbon filtered potable water to achieve a neutral pH condition on the surface.

2. The method according to claim 1 wherein the acidifier comprises anhydrous citric acid.

3. The method according to claim 1 wherein the oxidizer comprises sodium persulfate.

4. The method according to claim 1 wherein the first composition is a gel comprising a mixture of an acidifier, an oxidizer and rheology modifier.

5. The method according to claim 1 wherein the rheology modifier is xanthan gum.

6. The method according to claim 1 wherein the first composition is a fluid comprising a mixture of an acidifier, an oxidizer and activate carbon filtered potable water.

7. The method according to claim 1 wherein the predetermined period of time is about 30 minutes to 60 minutes.

8. The method according to claim 1 further comprising the step of repeating the applying of the first composition and rinsing of the first composition from the substrate surface utilizing activated carbon filtered potable water to remove any contaminates remaining after the repeated rinsing.

9. The method according to claim 1 further comprising the step of initially rinsing the substrate surface with activated carbon filtered potable water prior to applying the first composition.

10. The method according to claim 9 further comprising the step of blasting the substrate surface with an abrasive material after the initial rinsing and prior to applying the first composition.

11. The method according to claim 1 further comprising the step of applying a nano-structured particle-containing coating to the decontaminated and prepared surface.

12. The method according to claim 11 wherein the nano-structured particle is a quartz nano-structured particle.

\* \* \* \* \*